US008407203B2

(12) United States Patent
Minnich

(10) Patent No.: US 8,407,203 B2
(45) Date of Patent: Mar. 26, 2013

(54) COMPUTER SYSTEM FOR ENHANCED TAXONOMY MANAGEMENT

(75) Inventor: Mirko Minnich, Merion, PA (US)

(73) Assignee: Elsevier Inc., New York, NY (US)

(*) Notice: Subject to any disclaimer, the term of this patent is extended or adjusted under 35 U.S.C. 154(b) by 0 days.

(21) Appl. No.: 13/099,264

(22) Filed: May 2, 2011

(65) Prior Publication Data

US 2012/0284306 A1 Nov. 8, 2012

(51) Int. Cl.
G06F 7/00 (2006.01)
G06F 17/30 (2006.01)
(52) U.S. Cl. .............. 707/708; 707/777; 707/E17.099
(58) Field of Classification Search .......... 707/736, 707/999.102, 708, 777, 999.003, E17.099
See application file for complete search history.

(56) References Cited

U.S. PATENT DOCUMENTS

| 6,442,545 | B1* | 8/2002 | Feldman et al. | 1/1 |
|---|---|---|---|---|
| 6,675,159 | B1* | 1/2004 | Lin et al. | 1/1 |
| 6,901,394 | B2* | 5/2005 | Chauhan et al. | 706/60 |
| 7,392,244 | B1* | 6/2008 | Dean et al. | 1/1 |
| 7,505,956 | B2* | 3/2009 | Ibbotson | 707/736 |
| 7,650,327 | B2* | 1/2010 | Remsen et al. | 707/737 |
| 7,925,444 | B2* | 4/2011 | Garrity et al. | 702/19 |
| 8,014,997 | B2* | 9/2011 | Huang et al. | 704/7 |
| 8,126,908 | B2* | 2/2012 | Vasudevan et al. | 707/769 |
| 8,229,881 | B2* | 7/2012 | Pedro et al. | 707/600 |
| 2007/0203929 | A1* | 8/2007 | Bolivar | 707/101 |
| 2008/0046450 | A1* | 2/2008 | Marshall | 707/100 |
| 2010/0088303 | A1* | 4/2010 | Chen et al. | 707/706 |
| 2010/0198841 | A1* | 8/2010 | Parker et al. | 707/750 |
| 2010/0205180 | A1* | 8/2010 | Cooper et al. | 707/740 |
| 2011/0004628 | A1* | 1/2011 | Armstrong et al. | 707/778 |
| 2011/0040796 | A1* | 2/2011 | Shockro et al. | 707/794 |
| 2011/0106795 | A1* | 5/2011 | Maim | 707/728 |
| 2012/0117050 | A1* | 5/2012 | Vasudevan et al. | 707/706 |

OTHER PUBLICATIONS

Gruber, "Toward Principles for the Design of Ontologies Used for Knowledge Sharing", Aug. 23, 1993.*

* cited by examiner

*Primary Examiner* — Brannon W Smith
(74) *Attorney, Agent, or Firm* — Troutman Sanders LLP

(57) ABSTRACT

A computer system and method are provided to promote the creation of a dynamically alterable taxonomy supporting query based database investigations is select fields. The system operates seamlessly and transparent to the underlying system search functions. A query that uses search terms unrecognized by the then extant taxonomy triggers a series of operations that test the new terms and updates the taxonomy as appropriate. To facilitate speed and accuracy, the system creates incentives to promote the enhancement of the taxonomy for an emerging technology.

6 Claims, 6 Drawing Sheets

Figure 4

| MD CONSULT PREVIEW | User Name: | Password: | Log in |

Home First CONSULT Books Journals The Clinics Patient Education Drugs Guidelines Images News CME Help Search [All Sections] for [hypertension] [Search]

You are here: Home > Books

Books

MD Consult brings the leading medical resources together into one integrated online service to help you efficiently find answers to pressing clinical questions and make better treatment decisions.

Sign up now for a free 30-day trial!

Alphabetically | Specialties

- Allergy, Asthma & Immunology
- Alternative Medicine
- Anesthesiology & Pain Management
- Cardiology
- Dermatology
- Emergency Medicine
- Endocrinology & Metabolism
- Family Medicine
- Gastroenterology
- Geriatric Medicine

- Hematology
- Hospice & Palliative Care
- Infectious Disease
- Internal Medicine
- Nephrology
- Neurology
- Obstetrics & Gynecology
- Oncology
- Ophthalmology
- Orthopedic Surgery

- Otolaryngology
- Pathology
- Pediatrics
- Physical Medicine & Rehabilitation
- Psychiatry
- Pulmonary Medicine
- Radiology
- Rheumatology
- Surgery, General
- Urology

COMPUTER SYSTEM FOR ENHANCED TAXONOMY MANAGEMENT

The present invention is directed to computer systems for managing how information is delivered to and retrieved from structured databases. More particularly, the present invention provides a novel computer system and programmed method for building a powerful taxonomy for selected subjects allowing for enhanced query based access to searchable data indexed and stored electronically for retrieval.

FIELD OF THE INVENTION

The present invention is particularly useful in technology database storage and access, and includes many diverse technologies in the fields of chemistry, physics, electronics, mathematics, medicine, engineering and the like. In each of these fields and for many more, the researchers and others that practice in that specific art often develop highly specialized nomenclature and/or vocabulary for describing their ideas and concepts. In this context for example, doctors specializing in cardiac surgery have, over the years, developed highly specialized terms for selected heart-specific ailments, conditions, procedures and tools. For example, the word "stent" has a particular meaning to a heart surgeon—a meaning that has become established with particular relevance that is unique to the cardiac field. In other fields, the term "stent" may have a different meaning or usage.

BACKGROUND OF THE INVENTION

Taxonomy is the practice and science of classification. It is not only a vocabulary having a subject specific set of definitions; it is a scheme or set of rules regarding how things relate to each other in a given category—in e.g., hierarchal notation. As noted above, there are vast array of taxonomic structures in place on many subjects. It is now well recognized that communicating effectively on a given subject depends in part on having a well defined and mature taxonomic scheme for that subject. Subjects, such as Organic Chemistry that have developed over the years have achieved established and powerful taxonomies that permit researchers to effectively communicate—even when using different languages.

For new areas of research or reference, it is therefore important to quickly develop a useful taxonomy that facilitates effective communication using conventional research or reference outlets—papers, articles etc.—searchable by various database systems. It was with this understanding of database systems that has led to the development of the present inventive system.

OBJECTS AND SUMMARY OF THE PRESENT INVENTION

It is therefore an object of the present invention to provide a data processing system for selective and enhanced query based searching that includes a flexible taxonomy management system.

It is another object of the present invention to provide a taxonomy development module appended to a database and search system that permits the creation and certification of a new taxonomy for emerging fields of technology and science, such as healthcare.

It is still another object of the present invention to provide a computer network that is selectively programmed to collect new taxonomy terms during the search process and to filter these terms to determine whether to keep or discard the term by communicating to a community of experts in the field associated with the new term under consideration.

It is still another object of the present invention to provide a searchable database associated with a given subject and a preliminary non-final taxonomy to assist in searching wherein a program controlled module provides a series of qualifying tests to filter potential terms and resolve which terms should be implemented as a part of the growing taxonomy for active searching by researchers in the associated field.

The above and other objects of the present invention are realized in a novel computer system configured to allow interactive database searching on selectable topics. The computer system is typically networked based, with a USER enhanced interface that preferably allows operation through Internet specific protocols (eg., TCP/IP). In one embodiment, a System Administrator manages database access, charges a fee and delivers content in response to search term, in accordance with a stored taxonomy associated with the selected technical subject matter of the search. For emerging technologies, new terms that flow into the system that are not part of the original or modified vocabulary of that subject are processed in a programmed controlled module to ascertain meaning and appropriateness as a new term in the taxonomy. In one configuration, the system includes a series of tests that determine if the new terms should be included in a "suggestion box" operation. In one arrangement, the term is assessed by a group of researchers or other qualified individuals in the field of interest. If the new term is found to be a useful part of the taxonomy by the expert panel, it will be certified and placed into the taxonomy for use with future searches. If not, it will be flagged so as to deter future reliance thereon by the searching community.

In the varying approaches to implement the present invention, a novel incentive system is established to provide a more focused assessment of term usage and taxonomy management. In one illustrative arrangement, researchers that have their terms adopted as part of the taxonomy are provided recognition within their research community and reduced cost searching privileges. For the expert panels assessing new terms, incentives will be based on actual time and effort to properly screen new terms.

The foregoing features and benefits are illustrated in the following specific example of an inventive system provided below in conjunction with the figures, of which:

BRIEF DESCRIPTION OF THE FIGURES

FIG. 4 is a computer display screen depicting a data search field associated with "MD Consult" Web based reference services;

DESCRIPTION OF THE INVENTION AND ILLUSTRATIVE EMBODIMENTS THEREOF

By way of brief background, the present invention is directed to systems and processes for use in enhancing the collection, identification and location of information corresponding to specific topics of interest. Database searching is a mature art, so the specifics of query based database search and information access are only briefly touched on here to facilitate the understanding of the present invention. One particularly key aspect of proper searching resides in the use of a search term vocabulary that is engineered to provide the rapid identification of articles and related information without undue repetitive searching. The success of a search will be tied, not only to the proper terms used in the search, but also to the proper taxonomy associated with the database search engine logic.

Figure 1:
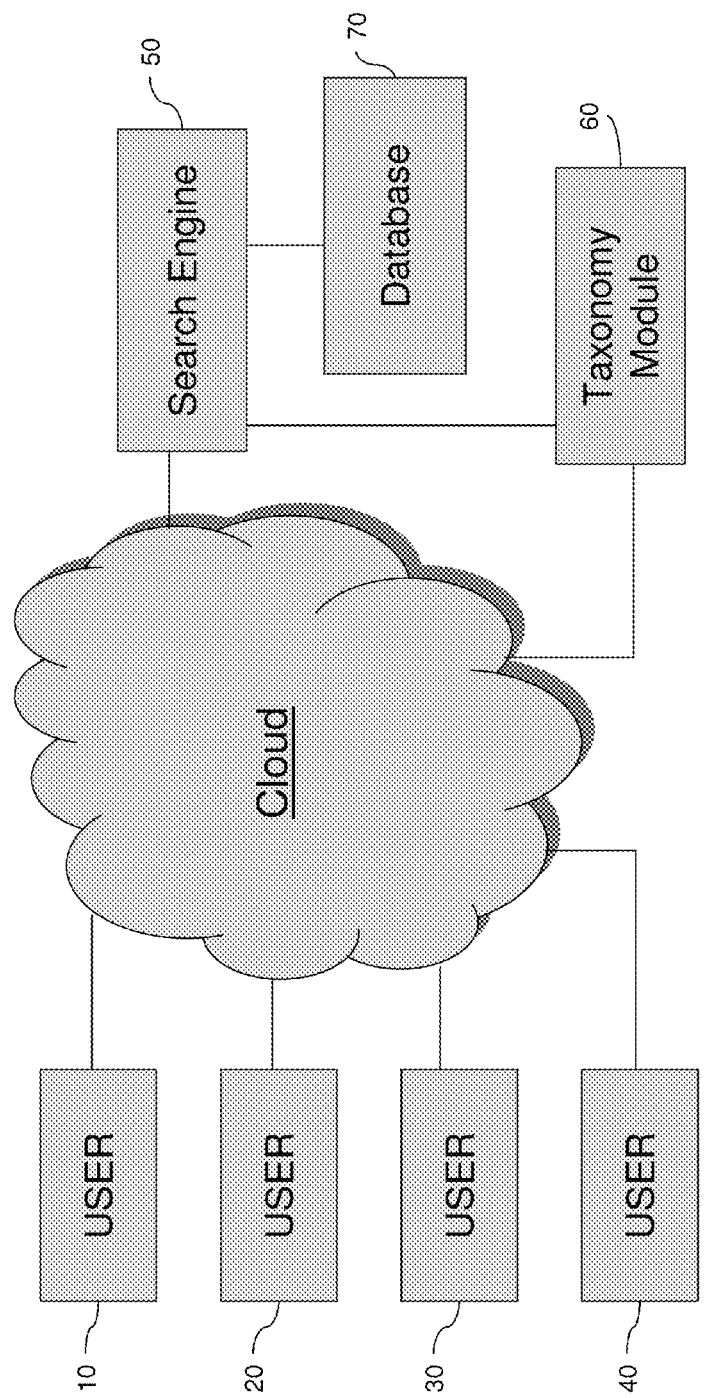
FIG. 1 is a functional block diagram of an illustrative computer system used to implement the present invention.

Turning now to FIG. 1, a system is disclosed that is designed and engineered to permit the rapid building of a powerful taxonomy for an emerging technology, and also to assist in the refinement of the taxonomy after it is built so as to enhance the searching experience by accelerating the presentation of search results that address the searcher's objectives. The system of FIG. 1 includes a network based communication protocol that utilizes the Internet and in particular, the world wide web to facilitate the search process. Users access the database and search engines through User workstations (four are illustrated: blocks 10-40), each of which interacts with a remote search engine 50 via the "cloud" or other web based facilities. Typically, sophisticated search engines and databases are subscription based, with various login functions to insure proper authorization and usage rights. A database 70—typically proprietary to the vendor operating the search engine, is configured with topic specific data with a vast array of search enhancing capabilities. A myriad of search algorithms exist to assist in locating responsive information and the information is often in the form of papers, articles and the like. Notwithstanding these enhanced features, searching relies heavily on the use of key terms—and the existence of the taxonomy to ascertain the term and its responsive information and related content. Accordingly, the database is associated with at least one taxonomy module 60 for implementing key term searching using the stored vocabulary.

An important feature of the present invention is the ability to quickly develop an effective taxonomy for a new, emerging technology. This is accomplished by implementing a programmed taxonomy building algorithm that works in conjunction with the search/database functions of the overall system. Specifically, the taxonomy module includes a dynamic taxonomy vocabulary that is updated with new terms in accord with the approach depicted in FIG. 2.

The approach can be used with most Web applications that involve a query operation—either remote of local—that involves the use of special "terms of art" within the field. Typical applications include "MD Consult" or "Nursing Skills" as supported by Elsevier, Inc, the assignee of the present invention. Both of these platforms include a sophisticated User interface that includes a search or query box configuration. To locate a salient reference, an appropriate query is formulated and entered by the user. This term is then applied against an index in accord with one or more search algorithms to identify responsive references—these are then collected and listed with abstract or other summary information to allow the User to select and review each.

Figure 2:
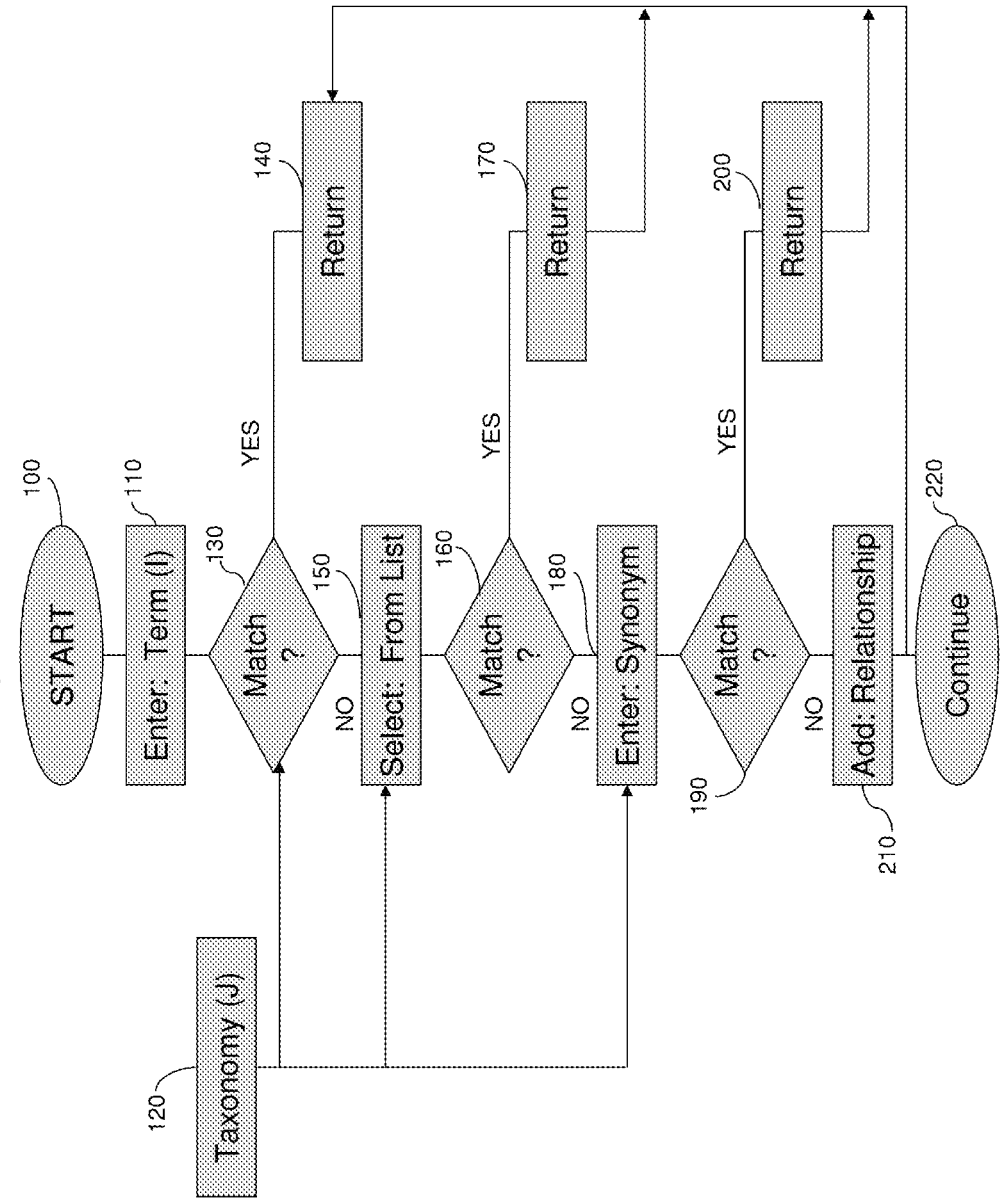
FIG. 2 is a logic flow chart depicting the operating process for one embodiment of the present invention.

Turning now to FIG. 2, a logic diagram depicts the programming for one implementation of the taxonomy module provided in FIG. 1. Logic begins at block 100, and the first search term is entered and identified at block 110 using conventional counter variables such as (I) for tracking purposes. The entered term is compared to the then existing taxonomy, block 120 for that area of research. If a match occurs, "yes" to test 130, the process ends with the term used to search the database, block 140. However, if the test 130 results in a negative response, a first test is performed to insure that there were no obvious typographic or spelling errors (not shown). If the term is proper, logic then continues to block 150 and the User is presented with a drop down listing of choices for the otherwise unrecognized term entered by the User. The list presented to the User is selected based on a best fit algorithm that attempts to pool a group of terms logically connected or related to the entered word.

If the User selects an entry provided in the drop down list, test 160 passes logic to block 170 and processing ends again with the new term used to probe the database in the search. However, if the drop down menu involves terms not suitable for the search and is rejected, logic continues to block 180. At this point, the system requests that the User enter a new term—a potential synonym selected by the User. Alternatively, the system may propose one or more synonyms for selection by the User. In either event, the original term has been found "undefined" and the User is given a chance to supplement the analysis by choosing and entering a possible synonym. At test 190, the system assesses the new "synonym" term—with a match ending processing and returning to the search with the new term for the query, block 200.

However, if no synonym is found or selected, logic continues to block 210 and the User is prompted to enter in details regarding the term or terms he/she has used up to this point. Specifically, the User provides information linking the originally entered term to the searched field—expressed as a "relationship" between the term and the subject. Once completed, logic continues, block 220—and the search is undertaken.

Figure 3:
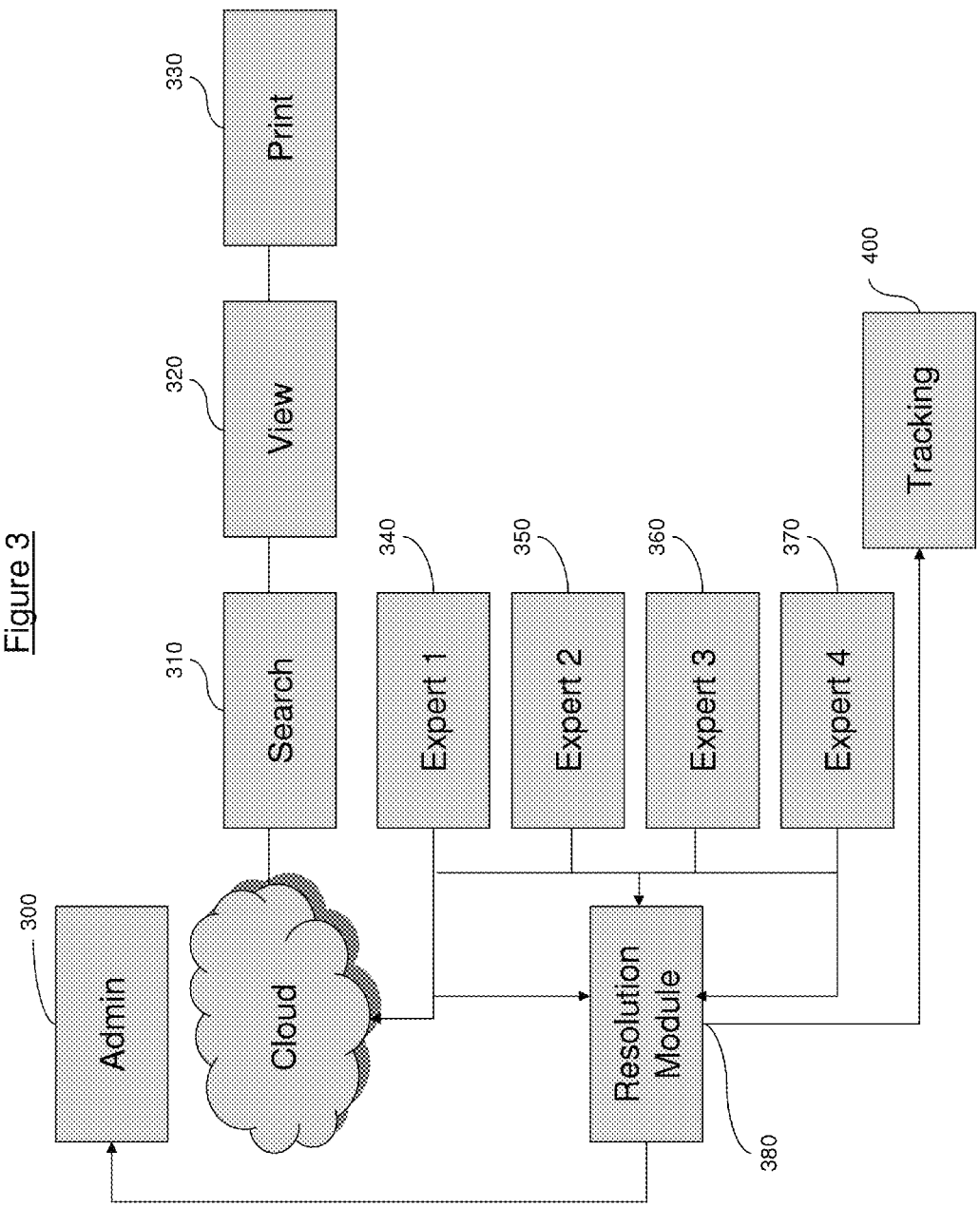
FIG. 3 is an illustrated example of the system for use in research associated with cardiac conditions and related medical information.

The foregoing interactions have been recorded by the systems and will be used to determine if the taxonomy should be adjusted or expanded, based on the terms inputted and the collective assessment of these terms. This is implemented by the system depicted in FIG. 3, with the search process interconnected to a Resolution Module, block 380. Specifically, the search routine is provided by the "Search" block 310 followed by "View" and "Print" blocks 320 and 330 respectively. This typical search routine is governed by the logic discussed above and the data collected in this process is now applied to the Resolution Module, complemented by the review and assessment of one or more industry experts, blocks 340-370 respectively, analyzing the newly applied "term" to determine whether the current taxonomy should be modified and/or supplemented with the new term. Part of this analysis includes a tracking module, block 400 that tracks the work done by the experts and provides some form of credit to reward work by the panel.

In addition to tracking the evaluation work by the panel of experts, the tracking module also tracks the contributions of the Users that are involved in adding new terms to the taxonomy. Rewards can vary, but are selected so that the taxonomy is rapidly built by the interactive work of the Users and the expert panelists participating in the otherwise conventional database query process. In this way, the entire taxonomy construction process, including new term and relationship additions, is done relatively seamlessly and transparently—but accurately and with great speed.

EXAMPLE

The foregoing operations may be better understood in view of the following example, based on the query based MD Consult as provided in FIG. 4. A User enters a query in the field of cardiology: such as "hypertenion" in the search box of the Web application. A look-up on the current taxonomy results in no match for the term: hypertenion, and the system logic now begins the analysis to determine if this new term should be added to the taxonomy. First, the spelling is checked; assuming the User indicates that hypertenion is the proper term and not a misspelling of "hypertension" the system begins the internal and then external evaluation of the term to decide whether the current version of the Taxonomy for the cardiology subject matter should be modified and/or supplemented.

Figure 5:
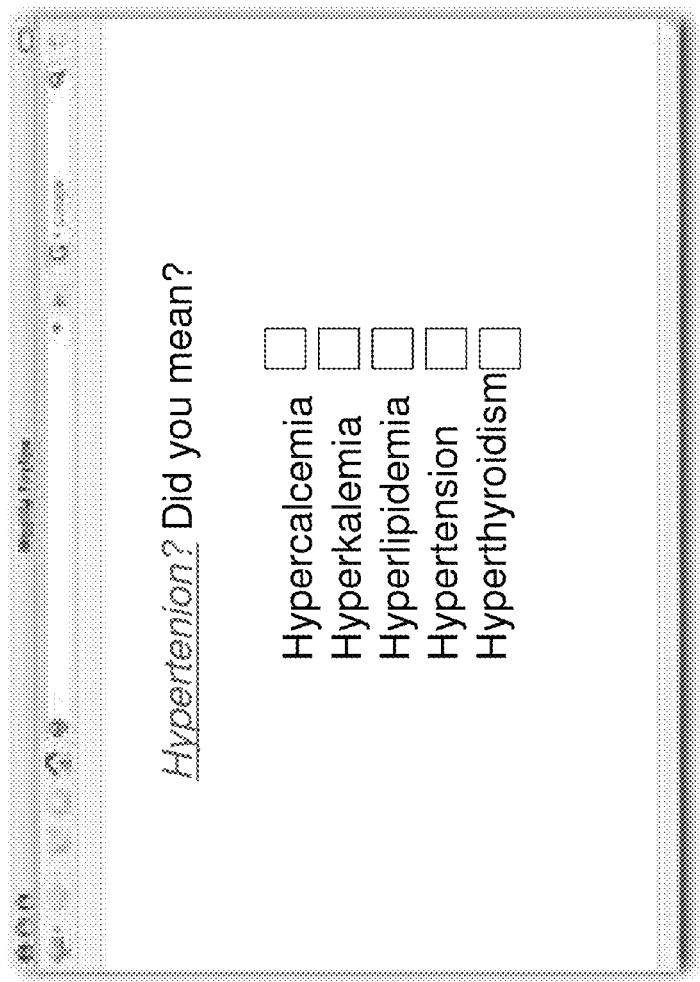
FIG. 5 is a computer display screen depicting an illustrative system response in accordance with one embodiment of the present invention.
Figure 6:
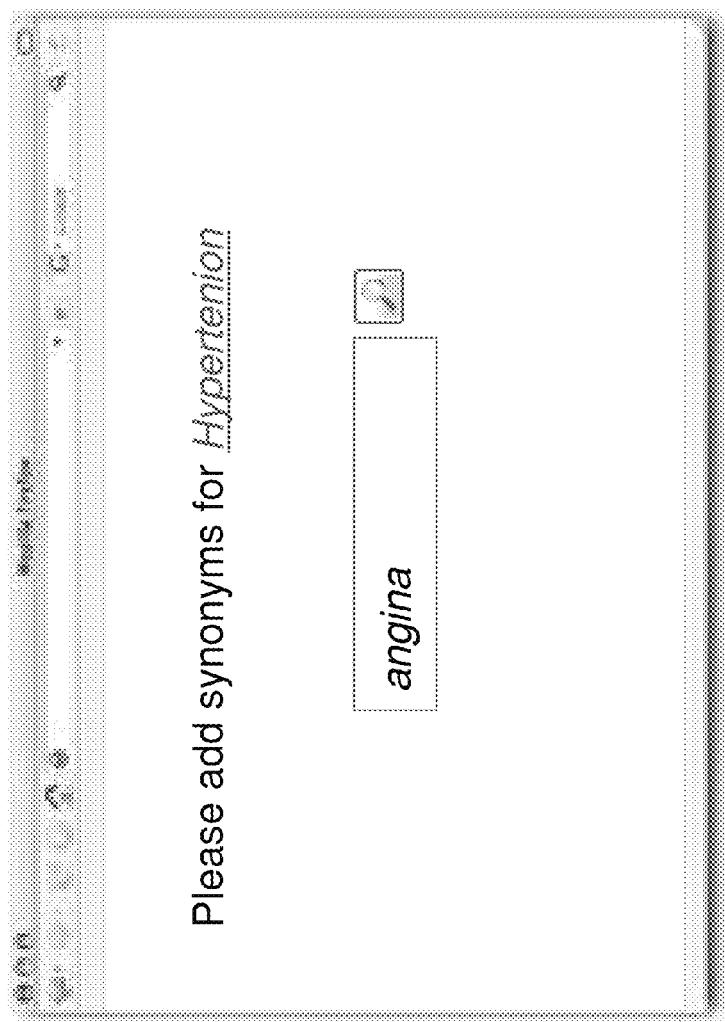
FIG. 6 is a computer display screen depicting a second illustrative system response in accordance with one embodiment of the present invention.

Specifically, once the spell check is passed, the system offers a list of choices or alternatives to the User—in this arrangement, (see FIG. 5) the system logic picks the following terms for consideration:

Alternatives
1. HYPERCALCEMIA
2. HYPERKALEMIA
3. HYPERLIPIDEMIA
4. HYPERTENSION
5. HYPERTHYROIDISM None are selected, so the system logic provides an entry field for User submission of a possible synonym; in this example, the User enters the term: "angina" which is then applied to discern the proper usage of the initially entered term (see FIG. 6). If resolution still eludes the logic of the system, a final query is made—seeking a definitional relationship to the subject matter: cardiology—to the User. Here, the User now enters a more complete narrative providing the "relationship" between the unrecognized term or terms and the subject matter of the query.

The foregoing interactions are used in total or in part to create a "record" of the term and its application to the taxonomy. This record is used with embedded AI (artificial intelligence) to see if resolution of the taxonomy can be made. Preferably, the system is connected to a network of "experts" in the field—through either known communities—e.g., twitter, facebook, myspace or linkedin—so that traditional review can be accomplished. This review however is best mediated with a database and controlled interface as quantitative measurements of performance is implemented to allow incentive rewards for the work by the experts.

After the review, the system updates the taxonomy in accord with recommendations of the panel and the system mandates. If new terms are added to the taxonomy, the system provides credits to the User and/or the expert panelists in accord with the incentive program in place. In one arrangement, the applicable incentive is selected by use of a "look-up" table and operation, as applied against a stored incentive reward schedule that includes a plurality of potential incentives and/or incentive levels.

The foregoing disclosure refers to network based computer system for the preferred embodiment where conventional hardware is applied to support the system software and application based algorithms. In the network based system, servers are used to facilitate large database access, and depending on the extent of the database, large server "farms" may be used, as governed by a central administrator computer with properly configured processors. For smaller systems, a single server/workstation arrangement can be employed wherein operation is consolidated within a single computer with local storage. The selection of the software, coding, communication protocols and platform architecture will depend to some extent on the size and speed of the database system and its integration within a larger network or community.

While the invention has been particularly shown and described with reference to a preferred embodiment, it will be understood by those skilled in the art that various changes in form and detail may be made therein without departing from the spirit and scope of the invention.

What is claimed is:

1. A computer system for managing database queries, comprising:
    a computer processor configured to implement a query based search, wherein said processor is responsive to a query entry from a user and based on said query entry selectively entered, implements a taxonomy module for ascertaining whether the query entry is (i) part of an existing taxonomy for a selected subject, and if not, (ii) whether the query entry should be used to supplement the existing taxonomy;
    said processor is further programmed to receive from the user information linking the query entry to the selected subject, when it is ascertained that the entered term should be used to supplement the existing taxonomy;
    a network based communication link for distributing the received information to a community of experts;
    a computer controlled interface configured to provide access to the community of experts for assessment of whether the received information should be used to supplement the existing taxonomy; and
    a non-transitory computer readable storage medium for storing (i) credits provided to the user when at least a portion of the received information is added to the existing taxonomy, and (ii) credits and/or incentives provided to a member of the community of experts for work in assessing possible taxonomy terms.

2. The system of claim 1 wherein the system includes a filter to test whether the entered query includes terms that should be considered for inclusion in said taxonomy, wherein said tests include a incorrect spelling screen, a drop down selection screen and a synonym screen.

3. A computer system, comprising:
    a computer server connected to a network and in communication with one or more workstations, said server comprising a computer processor programmed to implement a query based search for information stored in computer readable files, wherein said processor facilitates a search by implementing a dynamically modified taxonomy for a subject;
    an input connection for receiving in said server query requests from a user using art-specific terms, wherein said server processes said query requests providing changes to said taxonomy pursuant to a programmed protocol;
    said processor is further programmed to receive, via said input connection, from the user information linking the query request to the subject, when it is ascertained that the query request should be used to supplement the dynamically modified taxonomy;
    a network based communication link for distributing the received information to a community of experts;
    a computer controlled interface configured to provide access to the community of experts for assessment of whether the received information should be used to supplement the existing taxonomy; and
    a non-transitory computer readable storage medium for storing (i) credits provided to the user when at least a portion of the received information is added to the existing taxonomy, and (ii) credits and/or incentives provided to a member of the community of experts for work in assessing possible taxonomy terms.

4. The system of claim 3 wherein said server tracks and implements a taxonomy modification incentive program to reward participants that comply with an incentive protocol.

5. A computer implemented method to facilitate the rapid building of a taxonomy for a select searchable subject matter, said method comprising:
- receiving, over a computer connection, a computer readable query based search request from a user;
- comparing, by a program controlled computer processor, a query term within said search request with a stored, subject specific taxonomy;
- implementing a taxonomy modification program on a computer comprising a series of tests to discern whether the stored taxonomy should be updated with said query term;
- receiving, by the computer connection, from the user information linking the query term to the subject, when it is discerned that the stored taxonomy should be updated with said query term;
- transmitting, by the computer connection, the received information to a member of a community of experts;
- receiving, by the computer connection, from the member an assessment of whether the received information should be used to supplement the existing taxonomy; and
- storing, in a non-transitory computer readable storage medium, (i) credits for the user when at least a portion of the received information is added to the stored taxonomy, and (ii) credits and/or incentives for the member of the community of experts for work in assessing possible taxonomy terms.

6. The method of claim 5 wherein said taxonomy modification program further comprises tests to characterize said query terms in said subject matter including selective entry of potential synonyms to said query terms.

* * * * *